United States Patent [19]

Danner et al.

[11] Patent Number: 5,601,746
[45] Date of Patent: Feb. 11, 1997

[54] WET-SLIPPAGE OF TEXTILE MATERIAL AND WET LUBRICANT THEREFOR

[75] Inventors: Bernard Danner; Francis Palacin, both of Riedisheim, France

[73] Assignee: Sandoz Ltd., Basel, Switzerland

[21] Appl. No.: 312,025

[22] Filed: Sep. 26, 1994

[30] Foreign Application Priority Data

Sep. 28, 1993 [DE] Germany .......................... 43 32 963.2

[51] Int. Cl.$^6$ .......................... D06M 13/02; D06M 13/10; C09D 191/06; D06P 7/00
[52] U.S. Cl. .......................... 252/8.86; 8/115.51; 8/115.6; 8/116.1; 8/137; 8/147; 8/494; 8/495; 8/500; 8/918; 8/921; 252/8.81; 106/271; 510/513
[58] Field of Search .......................... 106/271; 8/115.51, 8/115.6, 116.1, 129, 137, 147, 494, 495, 500, 918, 921; 252/8.6, 8.8, 8.86, 8.81; 510/513

[56] References Cited

U.S. PATENT DOCUMENTS

| 3,565,840 | 2/1971 | Mirabile et al. ........................... 260/23 |
| 4,055,433 | 10/1977 | Morones .................................... 106/10 |
| 4,329,390 | 5/1982 | Danner .................................... 428/264 |
| 5,389,136 | 2/1995 | Danner .................................... 106/271 |
| 5,447,643 | 9/1995 | Kelkenberg et al. .................... 252/8.6 |

FOREIGN PATENT DOCUMENTS

| 1925993 | 11/1969 | Germany . |
| 3003851 | 8/1980 | Germany . |
| 4206714 | 9/1993 | Germany . |
| 91787 | 5/1987 | Romania . |
| 1055344 | 1/1967 | United Kingdom . |
| 1349741 | 4/1974 | United Kingdom . |
| 1373937 | 11/1974 | United Kingdom . |
| 2043685 | 10/1980 | United Kingdom . |
| WO92/04409 | 3/1992 | WIPO . |
| WO93/18222 | 9/1993 | WIPO . |

OTHER PUBLICATIONS

*The Condensed Chemical Dictionary*, Eighth Edition, Hawley, p. 228. No Date.
Search Report—Germany—dated 29. Mar. 1994.
Search Report—Great Britain—dated 26. Oct. 1994.
Derwent Abstracts of: DE 1925993; DE 3003851; DE 4206714; JP 03130469; RO 91787 No Date.
English–language translation of JP Kokoku 5–47662 based from JP 30–130469 No Date.
English–language abstract of JP 5331766 No Date.
English–language translation of RO 91787 No Date.

*Primary Examiner*—Anthony Green
*Attorney, Agent, or Firm*—Robert S. Honor; Carl W. Battle; Michael P. Morris

[57] ABSTRACT

Aqueous dispersions (D) of a wax (W) dispersed in the aqueous phase by means of a dispersant (B), wherein in (D)

the wax (W) is (A) an oxidized hydrocarbon wax or a mixture of oxidized hydrocarbon waxes or a mixture or (A) and at least one non-oxidized hydrocarbon wax (P), the acid number of which is $\geq 5$, and the dispersant (B) is a non-ionogenic, anionic, cationic or amphoteric surfactant or a mixture of two or more of these surfactants, which displays an HLB $\geq 7$, and the dispersion (D) optionally contains at least one protective colloid (C), at least one agent (E) for pH-adjustment, at least one antifreeze agent (F) and/or at least one preserving agent (D), but is substantially free of other waxes than (A) and (P) and of other surfactants than (B) and (C), are eminently suitable as wet lubricants that are very stable to temperature modifications and to high electrolyte concentrations, especially as occurring in pretreatment and in dyeing of cellulosic substrates.

10 Claims, No Drawings

WET-SLIPPAGE OF TEXTILE MATERIAL AND WET LUBRICANT THEREFOR

In the treatment of textile fabrics in rope form, mainly pretreatment, dyeing, optical brightening or aftertreatment, in aqueous liquor under such conditions that in the textile substrate there may be formed creases or there may take place friction of substrate to neighbouring substrate or to parts of the machine, crease marks and chafe marks are undesired appearances, which as corresponding unlevelnesses then impair the aspect and possibly even the physical properties of the treated goods and hence of the ready-made goods. In order to counter these disturbing appearances, in the respective treatment stages there are used wet lubricants which diminish the tendency to formation and to stabilization of creases and consequently the marking of creases, in particular conveyance creases, and diminish the attrition substrate/substrate and substrate/metal and consequently the tendency to the formation and marking of chafes. A disturbing appearance in the use of wet lubricants is, however, their sensitivity to high electrolyte-contents of the liquors or/and to more or less pronounced temperature-variations or also, in particular, to high shearing-forces as may occur in some treatment assemblies (in particular in jet-dyeing machines).

It has now been found that certain aqueous wax oxidate dispersions, as defined below as (D), comply surprisingly well with the above requirements and are eminently suitable as wet lubricants, i.e. as lubricants that are efficient in aqueous medium, in particular on a wet substrate.

The invention relates to the process for increasing the wet slippage in the treatment of textile fabrics especially in rope form (in particular pretreatment, dyeing, optical brightening and/or aftertreatment) in aqueous liquor and to the respective wet lubricants suitable therefor.

The invention thus provides a process for the treatment of textile fabrics with a textile treatment agent (T) in aqueous liquor under such conditions as would otherwise favour the formation of crease marks or the occurrence of chafe marks in the textile substrate, wherein in addition to the textile treatment agent (T) there is employed a wet lubricant, which is an aqueous dispersion (D) of a wax (W) dispersed in the aqueous phase by means of a dispersant (B), wherein in (D)

the wax (W) is (A) an oxidized hydrocarbon wax or a mixture of oxidized hydrocarbon waxes or a mixture of (A) and at least one non-oxidized hydrocarbon wax (P), the acid number of which is $\geq 5$, and the dispersant (B) is a non-ionogenic, anionic, cationic or amphoteric surfactant or a mixture of two or more of these surfactants, which displays an HLB$\geq 7$, and the dispersion (D) optionally contains at least one protective colloid (C) but is substantially free of waxes other than (A) and (P) and of surfactants other than (B) and (C).

As waxes (A) there may be employed in general known waxes. The oxidized hydrocarbon waxes (A) are, in general, carboxy-group-containing oxidized and optionally partially saponified hydrocarbon waxes and comprise in general any synthetic and/or mineral waxes that in the oxidized form still display a wax structure, in particular oxidized microwaxes or oxidized polyolefin waxes (principally polyethylene waxes) or further waxes that are optionally synthetized directly in oxidized form, especially Fisher-Tropsch waxes, and also their wax-oxidates; the mentioned oxidized waxes, in particular the oxidized polyolefin waxes and the Fischer-Tropsch waxes, may optionally be partially saponified.

Among the mentioned waxes the oxidized and optionally partially saponified microwaxes, Fischer-Tropsch waxes and polyethylene waxes are preferred. These waxes are in general known and may be characterized by conventional parameters such as needle penetration (e.g. according to ASTM D-1321 or D-5), solidification point, dripping point, density, acid number and/or optionally also saponification number. Among the mentioned waxes (A) are preferred those with a needle penetration $\geq 20$ dmm, preferably in the range of from 0.1. to 15 dmm, and with an acid number in the range of from 5 to 70, advantageously 8 to 45, in particular 8 to 40. The density of the waxes (A) is advantageously in the range of 0.90 to 1.02, preferably 0.91 to 0.99, especially 0.92 to 0.97. Among the mentioned waxes are particularly preferred the oxidized polyethylene waxes, mainly oxidized low-pressure polyethylenes, before all those with a needle penetration in the range of 1 to 9 dmm.

In the dispersions (D) the waxes (A) may optionally be blended with non-oxidized hydrocarbon waxes (P).

As (P) come into consideration principally paraffin waxes with dripping point$\geq 40°$ C. advantageously in the range of from 40° to 110° C., preferably 50° to 105° C. mainly plate paraffin The quantity of (P) amounts advantageously to up to 100% of (A), preferably not above 50%, in particular not above 10% of (A).

Although (P) may be present, it is however preferred that (A) not be blended with (P) [i.e. that the total wax (W) consist essentially only of (A)]. Especially if the dispersions (D) are employed as wet lubricants in jet-dyeing machines it is preferred that all of the wax (W) consist essentially only of (A).

The acid number of (W) is advantageously$\geq 7$, preferably$\geq 8$. Principally the acid number of (W) is in the range of 5 to 70, advantageously 7 to 42, preferably 8 to 35. If, according to the above preference, (W) contains no (P) the acid number of (W) corresponds obviously to the one of (A).

As surfactants (B) come principally into consideration the following:

($B_1$) a non-ionogenic surfactant or a mixture of non-ionogenic surfactants with HLB$\geq 7$, ($B_2$) an anionic surfactant which is a carboxylic or sulphonic acid or a sulphuric or phosphoric acid partial ester or a salt thereof, or a mixture of such anionic surfactants, with HLB$\geq 7$, ($B_3$) a cationic surfactant which is an amino compound or a salt thereof or a quaternary ammonium compound or a mixture of such cationic surfactants, with HLB$\geq 7$, or ($B_4$) an amphoteric surfactant which is an amino- or ammonium-group-containing carboxylic or sulphonic acid or an amino- or ammonium-group-containing sulphuric or phosphoric acid partial ester, or a salt thereof, or a mixture of such amphoteric surfactants, with HLB$\geq 7$, or a mixture of two or more of the surfactants ($B_1$) to (B4), in particular a mixture of at least one surfactant ($B_1$) with at least one surfactant ($B_2$), ($B_3$) or ($B_4$).

As surfactants ($B_1$) come, in general, into consideration known compounds, essentially those with emulsifier, respectively dispersant character. Emulsifiers resp. dispersants of non-ionogenic character are known in great number in the art and are also described in the specialized literature, e.g. in M. J. SCHICK "Non-ionic Surfactants" (vol. 1 of "Surfactant Science Series", Marcel DEKKER Inc., New York, 1967). Suitable non-ionogenic dispersants ($B_1$) are principally oxyalkylation products of fatty alcohols, fatty acids, fatty acid mono- or dialkanolamides (in which "alkanol" represents in particular "ethanol" or "isopropanol") or fatty acid partial esters of tri- to hexafunctional aliphatic polyols, or further interoxy-alkylation products of fatty acid esters (e.g. of natural triglycerides), in which as oxyalkylation agents come into consideration $C_{2-4}$-alkylene-oxides and optionally styreneoxide and preferably at least 50% of the introduced oxyalkylene units are oxyethylene units; advantageously at least 80% of the introduced oxyalkylene units are oxyethylene units; with particular preference all of the introduced oxyalkylene units are oxyethylene units. The starting products for the addition of the oxyalkylene units (fatty acids, fatty acid mono- or dialkanolamides, fatty alcohols, fatty acid esters or fatty acid polyol partial esters) may be any known products as conventionally employed for the production of these surfactants, principally those with 9 to 24, preferably 11 to 22, more preferably 16 to 22 carbon atoms in the fatty radical. The fatty radicals may be unsaturated or preferably saturated, branched or preferably linear; there may be mentioned the following fatty acids: lauric acid, myristic acid, palmitic acid, stearic acid, oleic acid, arachic acid and behenic acid, as well as technical grade fatty acids, e.g. tallow fatty acid, coconut fatty acid, technical grade oleic acid, talloil fatty acid and technical grade soya oil acid and their hydrogenation and/or distillation products; as fatty acid mono- or dialkanolamides there may e.g. be mentioned the mono- or di-ethanol- or -isopropanolamides of the mentioned acids; as fatty alcohols there may be mentioned the derivatives of the respective mentioned fatty acids, as well as synthetic alcohols (e.g. tetramethylnonanol). As partial esters of the mentioned polyols there may e.g. be mentioned the mono- or difatty acid esters of glycerine, erythritol, sorbitol or sorbitan, in particular the sorbitan mono- or dioleates or -stearates. Among the mentioned products are preferred the oxyalkylated fatty alcohols, before all the oxyethylation products of saturated linear fatty alcohols, in particular those of the average formula

$$R-O-(CH_2-CH_2-O)_nH \qquad (I),$$

wherein R signifies an aliphatic, saturated, linear hydrocarbon radical with 11 to 22 carbon atoms
and n signifies 5 to 16, or mixtures thereof.

The HLB value of the surfactants ($B_1$) is advantageously in the range of 8 to 15, preferably in the range of 10 to 14. Among the compounds of formula (I) are preferred in particular those in which R contains 13 to 22 carbon atoms, before all 16 to 22 carbon atoms.

As anionic surfactants ($B_2$) come in general into consideration known acids of surface active character, as per se conventionally employed as dispersants, e.g. as emulsifiers or as detergents. These surface active anionic compounds are known in the art and are described in great number in the specialized literature, e.g. in "Surfactant Science Series", vol. 7 ("Anionic Surfactants"). In particular come into consideration anionic surfactants containing a lipophilic radical (in particular the radical of a fatty acid or an aliphatic hydrocarbon radical of a fatty alcohol) that contains 8 to 24 carbon atoms, advantageously 12 to 22 carbon atoms, in particular 14 to 22 carbon atoms, and may be aliphatic or araliphatic and where the aliphatic radicals may be linear or branched, saturated or unsaturated. Preferably the lipophilic radicals are solely aliphatic, in particular so as described above for the non-ionogenic surfactants. The carboxylic or sulphonic acid group may by linked directly to the hydrocarbon radical (in particular as fatty acid, e.g. in the form of soaps or as alkane sulphonic acid) or also over a bridge that may optionally be interrupted by at least one heteroatom and which is preferably aliphatic. The introduction of a carboxylic acid group may e.g. take place by carboxyalkylation of hydroxy-groups or monoesterification of a hydroxygroup with a dicarboxylic acid anhydride, e.g. in such a molecule as described above as starting material for the oxyalkylation to non-ionic surfactants or also of oxyalkylation products thereof, in which for oxyalkylation there may be employed oxiranes, principally ethyleneoxide, propyleneoxide or/and butyleneoxide and optionally styreneoxide, and preferably at least 50 mol-% of the introduced oxiranes are ethyleneoxide; these are e.g. addition products of 1 to 12 mols of oxirane to 1 mole of hydroxycompound, especially as mentioned above as starting product for the oxyalkylation. For carboxyalkylation there are employed principally halogenalkane-carboxylic acids, advantageously those in which the halogenalkyl radical contains 1 to 4, preferably 1 or 2, carbon atoms, halogen signifies preferably chlorine or bromine and the acid group may optionally be in salt form. A carboxygroup may e.g. also be introduced by monoesterification of an aliphatic dicarboxylic acid, e.g. by reaction of a hydroxycompound with a cylic anhydride, e.g. with phthalic acid anhydride or an aliphatic anhydride with 2 or 3 carbon atoms between the two carboxy groups, e.g. succinic acid anhydride, maleic acid anhydride or glutaric acid anhydride. Analogously phosphoric or sulphuric acid partial ester groups may be introduced by esterification. As sulphonic acids come essentially into consideration sulphonation products of paraffins (e.g. produced by sulphochlorination or sulphoxidation) of α-olefins and of unsaturated fatty acids. The anionic surfactants are advantageously employed in the form of salts; for salt-formation come preferably into consideration hydrophilizing cations, in particular alkali metal cations (lithium, sodium, potassium) or ammonium cations [e.g. unsubstituted ammonium, mono-, di- or tri-($C_{1-2}$-alkyl)-ammonium or mono-, di- or tri- —($C_{2-3}$—hydroxyalkyl)—ammonium or morpholinium] or also alkaline earth metal cations (e.g. calcium or magnesium). Among the mentioned anionic surfactants ($B_2$) are preferred those that are free of ester groups, mainly soaps, in particular amine soaps, as well as carboxymethylation products of oxyalkylated fatty alcohols and the sulphonic acids, preferably in salt form as mentioned above, especially as alkali metal salts. As cationic surfactants ($B_3$) there may be employed any compounds known per se, principally fatty amines, fatty aminoalkylamines and amidation products of alkylenediamines or polyalkylenepolyamines with a fatty acid radical, or further acylation products of alkanolamines of alkanolaminoalkylamines and their oxyalkylation products or/and quaternization products. The fatty radicals in ($B_3$) are e.g. such as described above for ($B_1$). The alkylene bridges between two nitrogen atoms in the alkylenediamines, polyalkylenepolyamines and alkanolaminoalkylamines contain advantageously 2 to 6, preferably 2 to 4, carbon atoms; the alkanolgroups in the alkanolamines and alkanolaminoalkylamines contain advantageously 2 or 3 carbon atoms. Preferred alkylenediamines, polyalkalenepolyamines, alkanolamines and alkanolaminoalkylamines are ethylenediamine, propylenediamine, N,N-dimethylaminopropylamine, hexamethylenediamine, diethylenetriamine, ethylene-propylene-triamine, dipropylenetriamine, monoethanolamine and 3-(β-hydroxyethyl-amino)-propylamine. For oxyalkylation there is advantageously added ethyleneoxide, e.g. 2 to 20 moles of ethyleneoxide per mole of amino compound, resp. per mole of fatty radical. For quaternization the quaternizable aminogroups are at least in part reacted with corresponding quaternizing agents, in particular as suitable for the introduction of $C_{1-4}$-alkyl or benzyl, preferably methyl or ethyl; the respective counterion is most simply such as is introduced by the quaternization reaction, e.g. methosulphate, ethosulphate or a halide ion, e.g. chloride or bromide. The non-quaternized surfactants ($B_3$) may, depending on the pH, be in the free base form or in the form of salts, e.g. as salts of low molecular aliphatic carboxylic acids (preferably with 1 to 6 carbon atoms, e.g. formic acid, acetic acid, propionic acid, lactic acid, malonic acid or citric acid) or strong mineral acids (preferably hydrochloric acid, sulphuric acid or phosphoric acid). Among the mentioned products are particularly preferred oxyethylated and optionally quaternized fatty amines, fatty aminopropylamines and fatty acid-N,N-dimethylaminopropylamides.

As amphoteric surfactants ($B_4$) come likewise into consideration known compounds, principally such as are obtainable by introduction of at least one anionic group into a surfactant of the kind of ($B_3$) containing a reactive hydroxy- or aminogroup [e.g. by carboxyalkylation of aminogroups, by esterification of hydroxygroups, by introduction of sulphato- or phospato-groups, by monoacylation of amino- of hydroxygroups with cyclic dicarboxylic acid anhydrides, analogously as described above for ($B_2$), by sulphomethylation of aminogroups, e.g. by reaction with formaldehyde and sodium bisulphite or by reaction of an aminogroup with the addition product of sodium bisulphite and epichlorohydrin] or also amphoteric compounds of the betaine type.

Preferably the surfactants (B) are free of easily saponifiable groups, in particular of ester groups.

Among the surfactants ($B_1$), ($B_2$), ($B_3$) and ($B4$) are preferred the surfactants ($B_2$) and, before all, ($B_1$).

According to a particularly preferred feature of the invention (B) consists exclusively of ($B_1$).

The weight ratio of (B) to (W) [i.e. to (A) and, if present, (P)] is expediently chosen at such values that an aqueous dispersion of (W) may be formed and is advantageously in the range of 10 to 50, preferably 12 to 40, in particular 15 to 35, parts by weight of (B) for every 100 parts by weight of (W).

According to a particular feature of the invention a protective colloid (C) is employed in addition to (B). As protective colloids come into consideration any conventional products known under this characteristic, preferably non-ionogenic compounds, in particular polysaccharides that have been chemically modified in order to increase their hydrophilicity [e.g. hydroxy-($C_{1-4}$-alkyl)- and/or carboxymethyl- and optionally methyl-modified polysaccharides] or hydrophilic vinyl polymers (e.g. polyvinlyalcohol or polyvinylpyrrolidone) or further oxyethylation products of higher aliphatic alcohols. The HLB of the protective colloids, in particular of the non-ionogenic ones, is advantageously>15, preferably≧16.5, especially in the range of 16.5 to 19.

Preferred protective colloids (C) are oxyethylation products of aliphatic fatty alcohols or synthetic alcohols, e.g. of those described above as starting products for the production of ($B_1$). Particularly preferred protective colloids correspond to the average formula

$$R_1-O-(CH_2-CH_2-O)_m H \qquad (II),$$

in which $R_1$ signifies an aliphatic hydrocarbon radical with 11 to 18 carbon atoms
and m signifies 24 to 100, and may be single compounds or also mixtures of such compounds.

Preferably m in formula (II) signifies 30 to 60, more preferably 35 to 50.

If there is employed a protective colloid (C) there are employed e.g. 2.5 to 30, advantageously 5 to 30, preferably 7.5 to 25, parts by weight of protective colloid (C) for every 100 parts by weight of (W). Since in aqueous medium protective colloids of the above described kind of formula (II) may tend relatively strongly to foaming, depending on the degree of oxyethylation, it is preferred to employ quantities as small as possible thereof, in particular less than 18 parts by weight thereof (e.g. 2.5 to 15 parts by weight thereof) for every 100 parts by weight of (W). The use of (C) is preferred before all in the case that as (B) there is employed ($B_1$).

The dispersions to be employed according to the invention may be produced in a very simple way, e.g. by mixing of the molten waxes (W) with (B) and diluting with water (e.g. by stirring-in), any further components may be added before or also after the dilution with water. There may be obtained very fine, stable (W)- and (B)-containing dispersions, while by addition of (C) the stability of (D) towards electrolytes may be further favourably influenced.

The aqueous dispersions (D) to be employed according to the invention are suitably formulated to such a solids content that they are stirrable and pourable and may be of thick to thin consistency. The content of (W) [i.e. of (A) and, if present, (P)] in (D) may vary in a corresponding suitable range and is advantageously in the range of 3 to 35, preferably 5 to 25% by weight of (W) referred to the weight of (D). The pH of the aqueous dispersions (D) may range from distinctly acidic to distinctly basic values, principally in the pH range of 4 to 12, and is advantageously chosen in correspondence to the surfactant system (B). For ($B_1$) the pH is advantageously in the range of from pH 6.5 to pH 11, preferably in the range from pH 7.5 to pH 10.5; for ($B_2$) the pH is advantageously in the range from pH 7.5 to pH 12, preferably in the range from pH 8 to pH 11; for ($B_3$) the pH is advantageously in the range from pH 3 to pH 7.5, preferably in the range from pH 3.5 to pH 6.5. For the adjustment of the pH-value there may be employed suitable additives (E), in particular bases ($E_1$) or acids ($E_2$). As bases ($E_1$) there are expediently employed water-soluble alkalis (e.g. alkali metal hydroxides), ammonia or low-molecular aliphatic optionally cyclic amines [e.g. mono-, di- or tri-($C_{2-3}$-hydroxyalkyl)-amine or morpholine], which, when using ($B_2$), may also serve for salt-formation of the corresponding free acids ($B_2$). As acids ($E_2$) there may e.g. be employed those mentioned above for the protonation of non-quaternary surfactants ($B_3$).

Optionally the dispersions (D) to be employed according to the invention may further contain at least one antifreeze additive (F).

As antifreeze additives (F) there may be employed known products, in particular non-ionogenic, mainly low-molecular amides (e.g. acetamide or urea) and aliphatic oligohydroxycompounds [e.g. with 2 to 12, preferably 3 to 10, in particular 4 to 8, carbon atoms, e.g. glycerine or/and mono- or oligo-($C_{2-4}$-alkylene)-glycols] or also their mono-($C_{1-4}$-alkyl)-ethers.

If (F) is employed its amount in (D) may vary in a broad scope. The weight ratio of (F) to (D) is advantageously in the range of 0.5 to 15 parts by weight of (F) for every 100 parts by weight of (D), preferably in the range of 1 to 10 parts by weight of (F) for every 100 parts by weight of (D).

Optionally the dispersions (D) to be employed according to the invention may further contain at least one preserving agent (G), which is suitably a biocide.

As (G) come into consideration before all fungicides and bactericides, e.g. commercially available products that may be used in the respective recommended concentrations.

The dispersions (D) that may be produced as described above are of very fine particle-size; there may e.g. be produced dispersions (D) in which the size of the dispersed particles is in the range of 0.01 to 10 μm, preferably 0.05 to 1 μm. The dispersions (D) may be directly handled and shipped so as they have been produced; there may, in particular, be produced very fine dispersions (D) of very high storage-stability and also such as are very stable to frost and heat.

The dispersions (D) to be employed according to the invention are advantageously substantially free of any other components than (A), (P), (B), (C), (E), (F), (G) and water, in particular free of silicone compounds.

The dispersions (D) described above find their use as wet lubricants, i.e. as assistants in the treatment with (T) (e.g. pretreatment, dyeing, optical brightening or aftertreatment) of textile fabrics under such conditions as would otherwise lead to crease marks or chafe marks on the substrate, but wherein the dispersions (D) to be employed according to the invention serve for avoiding the stabilization and marking of the folds occurring during the treatment and for avoiding damaging friction. These processes are essentially exhaustion processes from short liquors (weight ratio liquor/substrate e.g. in the range of from 3:1 to 40:1, mostly 4:1 to 20:1) under treatment conditions and durations conventional per se (e.g. in the range of from 20 minutes to 3 hours). The dispersions (D) may be washed out from the non-dried substrate (e.g. by rinsing or by soaping and optionally rinsing) and are washed out at the end of the process.

The treatment agents (T) are in general textile chemicals that after the respective treatment of the substrate are eliminated again from the substrate, e.g. by washing or/and rinsing, for that part that is not fixed on the substrate.

As (T) come into consideration the following subgroups:

($T_1$) pretreatment agents (mainly wetting agents, alkalis, detergents, bleaching agents), ($T_2$) main treatment agents (mainly wetting agents, dyestuffs, dyeing assistants, optical brighteners), ($T_3$) aftertreatment agents (mainly fixing agents for dyeings, detergents, stripping agents, alkalis), in which the respective treatments are carried out in aqueous medium.

As processes which otherwise would lead to crease marks in the textile substrate, there are intended essentially those in which the wet substrate, due to the action and optionally interference of various forces, tends to fold. The folds that are formed in these processes may as such, by stabilization during the treatment-process, lead to a marking of the folds or creases, which may lead to the disadvantages mentioned at the beginning. In these processes the dispersions (D), i.e. the wet lubricants, serve as anti-crease agents, insofar as they favour or render possible a slippage of the wet fabric respectively of the wet folds and consequently may hinder a damaging stabilization of the folds formed during the conveyance of the substrate. As treatment-processes causing creases (conveyance-folds) come mainly into consideration treatments on a winch (in particular in a winch-beck) or, before all, in jet-dyeing machines, in which the fabric is conveyed in each cycle over the winch, respectively through the jet, in which place the folding and/or the forces acting on the folds and which may lead to a stabilization of the folds (to form creases and then crease marks) are the strongest.

As processes in which friction occurs in or at the textile substrate, there are meant essentially those in which the wet substrate, due to the high speed of conveyance, conveyance through jets and/or modification of the conveyance direction and/or speed, is subject to friction against parts of the machine or against neighbouring substrate. The chafes occurring in these processes may, in the course of the treatment-process, lead to a marking of the same and to an impairing of the physical properties of the substrate (deterioration due to chafe marks). In these processes the dispersions (D) act as wet lubricants insofar as they favour, or render possible, a slippage of the wet fabric (especially on neighbouring fabric or on metal) and may thus hinder a damaging friction of the substrate. As treatment-processes causing chafes resp. chafe marks come mainly into consideration treatments in jet-dyeing machines, in which the substrate in each cycle is conveyed through the jet, at which place the relative acceleration and/or the forces acting on the substrate are the strongest, and in which the substrate in each cycle is tucked from the own layer in the liquor towards the jet, so that at the respective portions of the fabric the substrate/substrate acceleration or substrate/metal acceleration may in places of the substrate cause friction, which then may lead to the above-mentioned chafes and chafe marks.

As substrates that are suitable for the process of the invention and for the wet lubricants of the invention are suitable in general any substrates as may be employed in the mentioned processes, in particular those containing optionally modified cellulosic fibres, e.g. cotton, linen, jute, hemp, ramier and modified cotton (e.g. viscose rayon or cellulose acetates), as well as cotton-containing fibre blends, e.g. cotton/polyester, cotton/polyacrylics, cotton/polyamide or cotton/polyamide/polyurethane). The textile substrate may be employed in any form as can be treated in the mentioned processes, e.g. as tubular goods, as open-width fabrics or as half-ready-made goods, substantially in rope-form as is suitable for the winch or for the jet; there may be employed as well knittings as also weavings (e.g. fine to coarse single jersey or also interlock, fine to coarse weavings, terry cloth, velvet, open-work textiles and/or mechanically embroidered textiles).

The wet lubricants (D) of the invention are expediently employed in such concentrations as to lead to an efficient hindrance of crease-marking and chafe-formation in the respective processes. They are distinguished by their efficiency and yield and may display a high efficiency even at very low concentrations; advantageously they are employed in such concentrations that correspond to 0.01 to 2 g of (W) per liter of liquor, advantageously 0.02 to 1.5 g of (W) per liter of liquor, preferably 0.03 to 1 g of (W) per liter of liquor, most preferably 0.04 to 0.5 g or (W) per liter of liquor.

Since the wet lubricants (D) of the invention are distinguished by their high independence on temperature variations and are highly stable to electrolytes, they may also be employed in a broad choice of treatment conditions as occurring in the art for the treatment with textile chemicals (T), in particular for pretreatment with ($T_1$), for dyeing or optical brightening with ($T_2$) and for aftertreatment with ($T_3$), e.g. with ($T_1$) in boiling-off (e.g. kier-boiling), in desizing or in bleaching, with ($T_2$) in dyeing or optical brightening, or also with ($T_3$) in aftertreatment, in particular with cationic fixing agents for improving the fastnesses of dyeings (in particular the wet-fastness), before all however in dyeing. For the dyeing or optical brightening there may be employed any dyestuffs or optical brighteners ($T_2$) as suitable for the respective substrate and process and for the desired effect. For the dyeing of cellulose-containing substrates there may be employed any corresponding dyes, e.g. reactive dyes, direct dyes, vat dyes, sulphur dyes or even basic dyes, while for the dyeing of substrates consisting of fibre blends, in particular of cellulosic fibres and synthetic fibres, there may also be employed corresponding additional dyestuffs, in particular disperse dyes. The processes may traverse any desired temperature ranges as are conventionally employed for the respective substrate and the employed treatment-agent and as are used depending on the employed machine and the desired purpose, e.g. from room temperature (e.g. at the beginning of the dyeing) up to HT-conditions (e.g. in the range of from 102° to 140° C., in closed apparatus). Also the content in electrolytes of the liquors may vary as desired and as is else conventionally employed for the respective process, e.g. as corresponding to the concentrations of alkali metal compounds employed for boiling-off, for bleaching or for de-sizing, or to the alkali metal salt (e.g. sodium chloride or sodium sulphate) concentrations and/or alkali metal hydroxide or carbonate concentrations as are employed in dyeing with the mentioned dyes, be it as blending component in commercial dye compositions and/or as take-up assistant in dyeing or optical brightening, or further as alkalis that are employed in dyeing with sulphur dyes, vat dyes or reactive dyes.

As aftertreatment agents ($T_3$) for increasing the fastnesses of dyeings come in general into consideration known polycationic products of high charge density, principally aliphatic condensations products of dicyanodiamide or epichlorohydrin with an aliphatic mono- or polyamine or of epichlorohydrin and ammonia, which are optionally in protonated form. For these after-treatments there are advantageously employed dispersions (D) in which (B) consists essentially of ($B_3$) and/or ($B_1$), whereas for protreatment, dyeing and optical brightening the dispersant system (B) in (D) preferably consists essentially of ($B_1$) and/or ($B_2$). With particular preference (B) consists only of ($B_1$).

With particular advantage the dispersions (D) are employed as wet lubricants in dyeing, preferably in jet-dyeing machines, most preferably for the dyeing of cellulose-containing substrates.

Due to their high stability to temperature variations and to high electrolyte concentrations, the wet lubricants (D) of the invention may be employed under the mentioned conditions and exhibit optimum performance, without their activity being impaired. Due go the high stability to shearing forces of the wet lubricants (D), in particular of those that do not contain any non-oxidized wax (P) but consist essentially only of (A), (B) and optionally (C), (g), (F) and/or (G) in aqueous dispersions, these are also especially suitable as wet lubricants in jet-dyeing machines, before all in those in which the goods resp. the liquor are subjected to extremely high dynamic stress, respectively in which very high shearing forces become active in the liquor.

By the use of the wet lubricants (D) of the invention there may e.g. be obtained optimum pretreated, optically brightened, dyed and/or aftertreated materials, in which the effect of the respective treatment agent (T) [pretreatment agent ($T_1$), dyestuff of optical brightener ($T_2$) or aftertreatment agent ($T_3$)] is not impaired and the aspect of the goods is optimum.

The efficiency of the compositions (D) may be assessed by measurement of the friction coefficients, e.g. as follows: a first piece of fabric is tensioned adhearing to the bottom of a shallow flat trough, fixed by clamping at one end and covered with such a quantity of liquor as corresponds to the liquor-to-goods ratios conventional in practice; a 200 g weight with even, flat, rectangular bottom, on which a second piece of the same fabric is tensioned and fixed, is laid horizontally on it. Now the laid-on weight which is spanned with the second piece of fabric (="sled") is pulled in the direction of the length of the trough and of the first tensioned piece of fabric (="slide") until it sets in motion and until it reaches a constant speed, and there is assessed the tractive force that is afforded in order to set the "sled" horizontally in motion on the "slide", starting from the clamped end, and to move horizontally in the tractive direction at constant speed. By this there may be determined the static friction as well as the kinetic friction and consequently the coefficient of static friction as well as the coefficient of kinetic friction.

If by $N_0$ there is indicated the normal force (i.e. the weight of the "sled" on the "slide"), by $Z_S$ the horizontal tractive force that is necessary in order to set the "sled" in motion on the "slide" and by $Z_K$ the horizontal force that is necessary for maintaining in motion the "sled" on the "slide" at constant speed, the coefficient of static friction $\mu_S$ may be expressed by means of the following formula $$\mu_S = \frac{Z_S}{N_0}.$$

and the coefficient of kinetic friction $\mu_K$ may be expressed by the following formula $$\mu_K = \frac{Z_K}{N_0}.$$

By the use of (D) it is possible to bring not only $\mu_K$ but also $\mu_S$ to very low values.

In the following Examples parts and percentages are by weight; the temperatures are indicated in degrees Celsius. In the Application Examples the dyes are employed in commercial form with an active substance content of about 25%, the indicated concentrations refer to this form. C.I. signifies Colour Index. The sodium sulphate is employed as Glauber's salt and the indicated quantities thereof refer to Glauber's salt.

There are employed the following waxes, dispersants and protective colloids:

| Wax | Kind | Needle penetration (ASTM D-1321 or D-5) | Dripping point | Acid number | Density |
|---|---|---|---|---|---|
| ($A_1$) | Polyethylene, oxidized | 5 dmm | 103° C. | 25 | 0.96 |
| ($A_2$) | Polyethylene, oxidized | 2 dmm | 106° C. | 15 | 0.94 |
| ($A_3$) | Polyethylene, oxidized | 4 dmm | 104° C. | 16 | 0.94 |
| ($A_4$) | Polyethylene, oxidized | 7 dmm | 100° C. | 16 | 0.92 |
| ($A_5$) | Microwax, oxidized | 2 dmm | 98° C. | 13 | — |

Dispersants ($B_{11}$) Stearylalcohol-poly(10)-ethyleneglycolether
($B_{12}$) Hexadecanol-poly(10)-ethyleneglycolether
($B_{13}$) Stearylalcohol-poly(8)-ethyleneglycolether
($B_{21}$) Oleic acid
($B_{22}$) Sodium oleyl/cetyl-alcohol-poly(12)-ethyleneglycolacetate
($B_{31}$) Tallow fatty aminopropylamine of the formula R'—NH—$CH_2$—$CH_2$—$CH_2$—$NH_2$ in which
  R'=0.1% $C_{12}H_{25}$
  0.9% $C_{14}H_{29}$
  28.0% $C_{16}H_{33}$
  28.0% $C_{18}H_{37}$
  43.0% $C_{18}H_{35}$.

Protective colloid ($C_1$) Stearylalcohol-poly(40)-ethyleneglycolether.

For the production of the following dispersions the mentioned components are stirred into the molten wax in the indicated sequence.

EXAMPLE 1 DISPERSION ($D_1$)

7.00 parts of wax ($A_1$)
4.73 parts of dipropyleneglycol
1.60 parts of dispersant ($B_{11}$)
0.23 parts of potassium hydroxide
1.03 parts of protective colloid ($C_1$)
85.41 parts of water
pH 9.

EXAMPLE 2 DISPERSION ($D_2$)

7.00 parts of wax ($A_2$)
4.73 parts of dipropyleneglycol
1.60 parts of dispersant ($B_{11}$)
0.23 parts of potassium hydroxide
1.03 parts of protective colloid ($C_1$)
85.41 parts of water
pH 10.3.

EXAMPLE 3 DISPERSION ($D_3$)

7.00 parts of wax ($A_5$)
4.73 parts of dipropyleneglycol
1.60 parts of dispersant ($B_{11}$)
0.23 parts of potassium hydroxide
1.03 parts of protective colloid ($C_1$)
85.41 parts of water
pH 10.4.

EXAMPLE 4 DISPERSION ($D_4$)

7.00 parts of wax ($A_1$)
4.73 parts of dipropyleneglycol
1.60 parts of dispersant ($B_{12}$)
0.23 parts of potassium hydroxide
1.03 parts of protective colloid ($C_1$)
85.41 parts of water
pH 9.

EXAMPLE 5 DISPERSION ($D_5$)

7.00 parts of wax ($A_1$)
4.73 parts of dipropyleneglycol
1.60 parts of dispersant ($B_{13}$)
0.23 parts of potassium hydroxide
1.03 parts of protective colloid ($C_1$)
85.41 parts of water
pH 9.

EXAMPLE 6 DISPERSION ($D_6$)

7.00 parts of wax ($A_3$)
1.75 parts of dispersant ($B_{11}$)
0.15 parts of potassium hydroxide
91.10 parts of water
pH adjusted with little glacial acetic acid from 10 to 8.5.

EXAMPLE 7 DISPERSION ($D_7$)

7.00 parts of wax ($A_4$)
1.33 parts of dispersant ($B_{11}$)
0.11 parts of potassium hydroxide
91.56 parts of water
pH 7.9.

EXAMPLE 8 DISPERSION ($D_8$)

7.00 parts of wax ($A_1$)
1.23 parts of dispersant ($B_{21}$)
1.23 parts of morpholine
90.54 parts of water
pH 9.2.

EXAMPLE 9 DISPERSION ($D_9$)

7.00 parts of wax ($A_1$)
1.40 parts of dispersant ($B_{31}$)
0.60 parts of glacial acetic acid
0.40 parts of protective colloid ($C_1$)
90.60 parts of water
pH 4.2.

EXAMPLE 10 DISPERSION ($D_{10}$)

7.00 parts of wax ($A_1$)
1.23 parts dispersant ($B_{22}$)
1.23 parts of morpholine
90.54 parts of water
pH 9.4.

EXAMPLE 11 DISPERSION ($D_{11}$)

7.00 parts of wax ($A_1$)
4.78 parts of dipropyleneglycol
1.62 parts of dispersant ($B_{22}$)
0.24 parts of potassium hydroxide
1.04 parts of protective colloid ($C_1$)
85.32 parts of water
pH 9.4.

The friction coefficients $\mu_S$ and $\mu_K$ assessed with the Dispersions ($D_1$) to ($D_{11}$) according to the above indicated measure method on causticized cotton cretonne in a liquor containing 2 g/l of the respective Dispersions ($D_1$) to ($D_{11}$) and 50 g/l of sodium sulphate, at a liquor-to-goods ratio= 20:1, at 50° C., are as follows (reproducibility: ±2%)

| Dispersion | $\mu_s$ | Diminution in % | $\mu_k$ | Diminution in % |
|---|---|---|---|---|
| none | 1.37 | — | 1.16 | — |
| ($D_1$) | 1.08 | 21 | 0.90 | 22 |
| ($D_2$) | 1.10 | 20 | 0.97 | 16 |
| ($D_3$) | 1.14 | 17 | 1.00 | 14 |
| ($D_4$) | 1.12 | 18 | 0.97 | 16 |
| ($D_5$) | 1.06 | 23 | 0.91 | 22 |
| ($D_6$) | 1.04 | 24 | 0.92 | 21 |
| ($D_7$) | 1.06 | 23 | 0.93 | 20 |
| ($D_8$) | 1.14 | 17 | 0.97 | 16 |
| ($D_9$) | 1.03 | 25 | 0.89 | 23 |
| ($D_{10}$) | 1.09 | 21 | 0.95 | 18 |
| ($D_{11}$) | 1.13 | 18 | 0.98 | 15 |

Application Example A [Dyeing of pure cotton with reactive dyes—"cold dyers"—in the winch-beck]

100 parts of cotton weaving is introduced into 1600 parts of an aqueous liquor heated to 40° C., that contains 120 parts of sodium sulphate and 3 parts of Dispersion ($D_1$). A solution of 3.3 parts of C.I. Reactive Red 147 in 100 parts of water is added to the bath and the machine is run at 40° C. for 30 minutes. Then there are added 5 times, at intervals of 5 minutes between each addition, each time 20 parts of a 10% soda solution. The temperature is then increased to 60° C. and dyeing is continued at this temperature for further 30 minutes. After completion as usual (rinsing, washing) there is obtained a very level, red dyeing with an excellent aspect of the goods.

Analogously as Dispersion ($D_1$) the same amount of each of the Dispersions ($D_2$) to ($D_8$), ($D_{10}$) and ($D_{11}$) is employed in Application Example A.

Application Example B [Dyeing of pure cotton with reactive dyes—"hot dyers"—in the jet-dyeing machine (Laborjet MATHIS)]

100 parts of cotton weaving is introduced into 800 parts of an aqueous liquor heated to 80° C., that contains 70 parts of sodium sulphate and 2 parts of Dispersion ($D_1$). A solution of 3.1 parts of C.I. Reactive Blue 52 in 100 parts of water is given into the bath and the liquor is heated to 95° C. After 30 minutes at this temperature, there are added 5 times, at intervals of 5 minutes, each time 4 parts of a 3% NaOH-solution and dyeing is continued for further 40 minutes. After completion as usual (rinsing, washing), there is obtained a very level and regular blue dyeing.

Analogously as Dispersion ($D_1$) there is employed the same amount of each of the Dispersions ($D_2$) to ($D_8$), ($D_{10}$) and ($D_{11}$) in Application Example B.

Application Example C [Dyeing of pure cotton with sulphur dyes in the jet-dyeing machine (Laborjet MATHIS)]

100 parts of cotton weaving is introduced into 800 parts of an aqueous liquor heated to 40° C. that contains 2 parts of Dispersion ($D_1$), 10 parts of a 30% NaOH-solution, 3 parts of soda and 10 parts of glucose. A solution of 15 parts of pre-reduced C.I. Sulphur Black 1 in 100 parts of water is then added to the bath and the bath is heated to 95° C. When this temperature is reached, 100 parts of a 25% sodium chloride solution is added and dyeing is continued for further 40 minutes. Upon cooling to 70° C. the dye bath is drained-off and the goods are rinsed 4 times hot and 2 times cold.

Analogously as Dispersion ($D_1$) the same amount of each of Dispersions ($D_2$) to ($D_8$), ($D_{10}$) and ($D_{11}$) is employed in Application Example C.

Application Example D [Dyeing of pure cotton with direct dyes in the winch-beck ]

100 parts of cotton weaving is introduced into 1600 parts of a liquor heated to 40° C. that contains 3 parts of Dispersion ($D_1$). To the bath is then added a solution of 1.2 parts of C.I. Direct Violet 66 in 100 parts of water and the bath is heated to 95° C. When this temperature is reached, 100 parts of a 15% sodium sulphate solution are added over 20 minutes and dyeing is continued for further 30 minutes at constant temperature. After cooling to 70° C. the bath is drained-off and the goods are rinsed several times hot and cold. There is obtained a level violet dyeing of a very regular aspect.

Analogously as Dispersion ($D_1$) the same amount of each of Dispersions ($D_2$) to ($D_8$), ($D_{10}$) and ($D_{11}$) are employed in Application Example (D).

Application Example E [Dyeing of polyester/cotton blended fabric with disperse dyes and direct dyes in the jet-dyeing machine (Laborjet MATHIS)]

100 parts of a polyester/cotton blended fabric 67/33 is introduced into 900 parts of an aqueous liquor heated to 50° C., which contains 1.5 parts of Dispersion ($D_1$) and 10 parts of sodium sulphate. To the bath is then added a dispersion of 0.35 parts of Foron Yellow Brown RD-2RS, 0.09 parts of C.I. Disperse Red 73 and 0.11 parts of Foron Blue RD-GLF and a solution of 0.2 parts of C.I. Direct Yellow 162, 0.09 parts of C.I. Direct Red 83:1 and 0.33 parts of C.I. Direct Brown 240 in 50 parts of water. The pH value is then adjusted to 5 with acetic acid and the bath is then heated from 50 to 130° C. at a heating speed of 1.5° C./minute and dyeing is continued from 30 minutes at 130° C. The bath is then cooled from 130° C. to 70° C. and the dyeing is completed as usual (rinsing, washing). There is obtained a very level and regular brown dyeing.

Analogously as Dispersion ($D_1$) there is employed in Application Example E the same amount of each of Dispersion ($D_2$) to ($D_8$), ($D_{10}$) and ($D_{11}$).

Application Example F [Dyeing of polyester/cotton blended fabric with disperse dyes and direct dyes in the jet-dyeing machine (Rotostream Jet of THYSS)]

The procedure described in Application Example E is repeated in a jet-dyeing machine (Rotostream) of THYSS at a liquor-to-goods ratio of 10:1 with 200 kg of polyester/cotton blended fabric, 67/33, 2000 liters of liquor and two revolutions/minute (i.e. a liquor circulation of 4000 liters/minute). There is obtained as well a very level and regular brown dyeing.

Application Example G [Dyeing of polyester/viscose rayon staple fibre blended fabric with disperse dyes and direct dyes in the jet-dyeing machine (Laborjet MATHIS)]

100 parts of polyester/viscose rayon staple fibre blended fabric 70/30 is introduced into 900 parts of a liquor heated to 50° C., that contains 1 part of Dispersion ($D_1$) and 60 parts of sodium sulphate. To the bath is then added a solution of 0.35 parts of C.I. Reactive Blue 41 and 0.73 parts of C.I. Reactive Green 12 in 50 parts of water; after 20 minutes a solution of 1.5 parts of soda in 50 parts of water is added thereto; after 20 minutes a solution of 1.5 parts of soda in 50 parts of water is added and dyeing is continued for further 20 minutes at 50° C. Then a dispersion of 0.073 parts of C.I. Disperse Yellow 54 and 0.53 parts of C.I. Disperse Blue 60 in 50 parts of water is added to the bath and this is heated from 50° C. to 130° C. at a heating speed of 1.5° C./minute. Dyeing is continued for further 45 minutes at 130° C. and then the bath is cooled to 60° C. at a cooling speed of 2° C./minute. After completion in usual way (rinsing, washing) there is obtained a very level, green dyeing with a perfect aspect of the goods.

Analogously as Dispersion ($D_1$) there is employed in Application Example G the same amount of each of the Dispersions ($D_2$) to ($D_8$), ($D_{10}$) and ($D_{11}$).

Application Example H [Dyeing of polyester/viscose rayon staple fibre blended fabric with disperse dyes and direct dyes in the jet-dyeing machine (Rotostream THYSS)]

The procedure described in Application Example G is repeated with the difference that the process is carried out in a Rotostream jet-dyeing machine of THYSS with 200 kg of blended fabric at a liquor-to-goods ratio of 10:1 in 2000 liters of liquor, at a liquor circulation of 4000 liters/minute (i.e. two liquor revolutions/minute). There is obtained as well a very level green dyeing of perfect aspect of the goods.

Application Example J [Bleaching in the jet-dyeing machine (Laborjet MATHIS)]

100 parts of boiled-off cotton fabric is introduced into a jet-dyeing machine that contains 900 parts of an aqueous liquor heated to 50° C. To the bath are added a dispersion of 2 parts of Dispersion ($D_1$) in 33 parts of water, a solution of 1.2 parts of caustic soda in 33 parts of water and a solution of 3 parts of hydrogen peroxide (of 35% concentration) in 33 parts of water. Then the liquor is heated to 95° C. and the goods are treated during 45 minutes at this temperature. After cooling to 70° C. the bath is drained-off and the goods are rinsed hot and cold. There is obtained a bleached fabric without any chafe marks.

Analogously as Dispersion ($D_1$) there is employed in Application Example J the same amount of each of Dispersions ($D_2$) to ($D_8$), ($D_{10}$) and ($D_{11}$).

Application Example K [Cationic aftertreatment of a direct dyeing in the winch-beck]

The violet dyeing obtained according to Application Example D is treated with 1500 parts of a liquor of 50° C. that contains 3 parts of Dispersion ($D_1$) and 3 parts of a polycationic fixing agent (condensation product of 1 mole of dyethylenetriamine and 1 mole of dicyanodiamide, protonated with sulphuric acid). The dyeing is treated during 30 minutes at constant temperature and then, after draining-off of the liquor, it is rinsed several times with fresh water. There is obtained a very level violet dyeing with good wet fastnesses.

Analogously as Dispersion ($D_1$) there is employed in Application Example K the same amount of each of Dispersions ($D_2$) to ($D_7$) and ($D_9$).

We claim:

1. A process for the treatment of textile fabrics comprising contacting the textile fabrics with a textile treatment agent (T), selected from the group consisting of textile pretreatment agents, textile main treatment agents and textile aftertreatment agents, and a wet lubricant, which is an aqueous dispersion (D) of a wax (W) dispersed in the aqueous phase by means of a dispersant (B), wherein in (D) the wax (W) consists of (A) an oxidized hydrocarbon wax or a mixture of oxidized hydrocarbon waxes or a mixture of (A) and at least one non-oxidized hydrocarbon wax (P), the wax (W) having an acid number in the range of 5 to 70, and the dispersant (B) is selected from the group consisting of
a non-ionic, anionic, or amphoteric dispersant or a mixture of two or more of these dispersants, which dispersant (B) displays an HLB>7, wherein the weight ratio of (B) to (W) is in the range of 10 to 50 parts (B) for every 100 parts by weight (W), and the dispersion (D) optionally contains at least one protective colloid (C), wherein the weight ratio of (C) to (W) is in the range of 2.5 to 30 parts (C) for every 100 parts by weight (W), but (D) is substantially free of waxes other than (A) and (P), and of surfactants other than dispersant (B) and protective colloid (C), in an aqueous liquor, wherein the weight ratio of the aqueous liquor to the textile fabric is in the range of 3:1 to 40: 1, and washing the textile treatment agent (T) out of the textile fabric at the end of the treatment process.

2. A process according to claim 1, wherein (D) contains a protective colloid (C).

3. A process according to claim 1, wherein (D) contains at least one additive selected from the group consisting of at least one non-ionic protective colloid (C), at least one additive (E) in an amount effective for pH-adjustment, at least one antifreeze agent (F) in the weight ratio of 0.5 to 15 parts by weight (F) for every 100 parts by weight (D), and at least one preserving agent (G) in an amount effective for biocidal action.

4. A process according to claim 1, wherein (B) is a non-ionic sufactant or a mixture of non-ionic surfactants, with an HLB≧7.

5. A process according to claim 1, wherein the textile fabric is a cellulosic textile fabric.

6. The process according to claim 5, wherein the treatment of the cellulosic substrate comprises dyeing it in a winch-beck or in a jet-dyeing machine.

7. A process according to claim 1, wherein (D) is present in a concentration of from 0.01 to 2 g of (W) per liter of liquor.

8. A wet lubricant for treating textile fabrics which comprises an aqueous dispersion (D) of a wax (W) dispersed in the aqueous phase by means of a dispersant (B), wherein in (D) the wax (W) is (A) an oxidized hydrocarbon wax or a mixture of oxidized hydrocarbon waxes the wax (W) having an acid number in the range of 5 to 70, and the dispersant (B) is selected from the group consisting of
a non-ionic, anionic, or amphoteric dispersant or a mixture of two or more of these dispersants, which dispersant (B) displays an HLB>7, wherein the weight ratio of (B) to (W) is in the range of 10 to 50 parts (B) for every 100 parts by weight (W), and the dispersion (D) contains at least one protective colloid (C), wherein the weight ratio of (C) to (W) is in the range of 2.5 to 30 parts (C) for every 100 parts by weight (W), but (D) is substantially free of waxes other than (A), and of surfactants other than dispersant (B) and protective colloid (C).

9. The wet lubricant according to claim 8 consisting essentially of (W), (B) and water, and optionally at least one of the following additives: (C), a pH-adjusting additive (E), an antifreeze agent (F) and a preserving agent (G).

10. The wet lubricant according to claim 8 in which the aqueous dispersion (D) is free of silicone compounds.

* * * * *